(12) United States Patent
Yamamoto

(10) Patent No.: US 8,937,741 B2
(45) Date of Patent: Jan. 20, 2015

(54) PRINTING DEVICE HAVING MAIN BODY AND TRANSMITTING SIDE OPERATION SECTION

(71) Applicant: Seiko Epson Corporation, Tokyo (JP)

(72) Inventor: Yasuhisa Yamamoto, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/903,528

(22) Filed: May 28, 2013

(65) Prior Publication Data
US 2013/0321840 A1 Dec. 5, 2013

(30) Foreign Application Priority Data

May 30, 2012 (JP) ................................ 2012-122795

(51) Int. Cl.
G06F 3/12 (2006.01)
G06K 15/02 (2006.01)
H04N 1/00 (2006.01)

(52) U.S. Cl.
CPC ........ G06K 15/1801 (2013.01); H04N 1/00204 (2013.01); H04N 1/00411 (2013.01); H04N 1/00482 (2013.01); H04N 2201/0053 (2013.01); H04N 2201/0055 (2013.01); H04N 2201/0075 (2013.01); H04N 2201/0091 (2013.01)
USPC ........... 358/1.15; 358/1.2; 358/1.9; 358/1.13; 358/1.14; 358/1.16; 358/401; 399/8; 399/9; 399/16; 399/18; 399/19; 700/3; 700/14; 700/15; 700/17; 700/21; 700/23; 700/30

(58) Field of Classification Search
CPC .................................................. G06K 15/1801
See application file for complete search history.

(56) References Cited

U.S. PATENT DOCUMENTS

| | | | |
|---|---|---|---|
| 2006/0293765 A1* | 12/2006 | Tanaka et al. | 700/15 |
| 2009/0030762 A1* | 1/2009 | Lee et al. | 705/7 |
| 2010/0023608 A1* | 1/2010 | Hanano | 709/221 |

FOREIGN PATENT DOCUMENTS

JP 2008-193507 A 8/2008

* cited by examiner

*Primary Examiner* — Miya J Cato
(74) *Attorney, Agent, or Firm* — Global IP Counselors, LLP

(57) ABSTRACT

A multi-function printer main body has a copy function. A remote terminal conducts various kinds of copy settings or instructions to start copy. An execution button is provided in the multi-function printer main body. When the execution button is operated in normal time, copy is executed with the default settings. When copy is executed by inputting copy settings on the remote terminal side, copy can be executed again with the copy settings used for the last time by operating the execution button until a predetermined period of time passes. Therefore, in a case of executing copy with the default settings or repeatedly executing copy with the same settings as the settings used for the last time, a user's work burden can be reduced because it is sufficient for the user to operate the execution button 38.

8 Claims, 4 Drawing Sheets

PRINTING DEVICE HAVING MAIN BODY AND TRANSMITTING SIDE OPERATION SECTION

CROSS-REFERENCE TO RELATED APPLICATIONS

This application claims priority to Japanese Patent Application No. 2012-122795 filed on May 30, 2012. The entire disclosure of Japanese Patent Application No. 2012-122795 is hereby incorporated herein by reference.

BACKGROUND

1. Technical Field

The present invention relates to a printing device provided with a main body that executes printing, and a transmitting side operation section in which settings on printing are input and the input settings are transmitted to the main body by wireless communication.

2. Related Art

There has been proposed a device provided with an image forming device main body having an operation button, and a touch panel type liquid crystal display (operation section) which can be attached to and removed from the main body (for example, see Japanese Laid-open Patent Publication No. 2008-193507). In this device, when the operation section is attached to the main body, an optional function (such as a copy function, a printer function, a facsimile receiving and transmitting function, or the like) can be used by operating an operation key displayed on the operation section. When the operation section is not attached to the main body, only a basic function (a copy function) can be used by operating an operation button provided on the main body side.

SUMMARY

Problems to be Solved by the Invention

In a device in which a main body and an operation section are separated, various kinds of instructions are transmitted from the operation section to the main body by wireless communication. In such a case, the device is often configured such that only minimal operation buttons such as a power button or an execution button are provided in the main body, and detailed settings on various kinds of functions are conducted by the operation section. In order to use a copy function in this device, a user needs to do work to set a document to be copied on a document platen on the main body side, work to input various kinds of copy settings (settings on the number of copies, settings on the copy color, and settings on the magnification) to the operation section, and work to instruct to start execution of copy on the main body side or the operation section side. Specifically, in order to use a copy function, both of work on the main body side and work on the operation section side are required. Therefore, especially in a case of repeating copy with the same settings, a user's work burden is increased, which is not user-friendly.

In a copying machine according to the invention in which a main body and an operation section are separated, the main advantage is to reduce a user's work burden in a case of using a copy function.

The copying machine of the invention employs the following means to achieve the above-described main advantage.

Means Used to Solve the Above-Mentioned Problems

A copying machine of the invention, provided with a main body that executes copy, and a transmitting side operation section in which settings on copy are input and the input settings are transmitted to the main body by wireless communication, includes a receiving side operation section disposed on the main body side, and an operation corresponding process execution unit that executes an operation corresponding process corresponding to an operation in a case where the receiving side operation section is operated, in which the operation corresponding process execution unit executes a predetermined process different from inputting of the settings on copy as the operation corresponding process in a case where the receiving side operation section is operated before the main body executes copy in accordance with the settings received from the transmitting side operation section, and the operation corresponding process execution unit executes copy in accordance with the same settings as the received settings in a case where the receiving side operation section is operated after the main body executes copy in accordance with the settings received from the transmitting side operation section.

The copying machine of the invention, provided with the main body that executes copy, and the transmitting side operation section in which settings on copy are input and the input settings are transmitted to the main body by wireless communication, includes the receiving side operation section disposed on the main body side, and the operation corresponding process is executed corresponding to the operation in a case where the receiving side operation section is operated. Then, a predetermined process different from inputting of the settings on copy is executed as the operation corresponding process in a case where the receiving side operation section is operated before the main body executes copy in accordance with the settings received from the transmitting side operation section, and copy is executed in accordance with the same settings as the received settings in a case where the receiving side operation section is operated after the main body executes copy in accordance with the settings received from the transmitting side operation section. With this configuration, once copy is executed by inputting settings on copy to the transmitting side operation section and transmitting the input settings to the main body, copy can repeatedly be executed with the same settings only by operating the receiving side operation section disposed on the main body side. As a result of this, a user's work burden can be reduced when executing copy. Also, in normal time, a predetermined process different from settings on copy can be executed by operating the receiving side operation section.

In the above-described copying machine of the invention, the operation corresponding process execution unit can execute copy based on default settings as the predetermined process. With this configuration, in a case of executing copy based on default settings, it is possible to execute copy only by operating the receiving side operation section.

In the copying machine of the invention, the operation corresponding process execution unit can execute copy in accordance with the same settings as the operation corresponding process in a case where the receiving side operation section is operated before a predetermined period of time passes after copy is executed in accordance with the settings received from the transmitting side operation section, and the operation corresponding process execution unit can execute the predetermined process as the operation corresponding process in a case where the receiving side operation section is operated after the predetermined period of time passes. Alternatively, the operation corresponding process execution unit can execute the predetermined process as the operation corresponding process in a case where the receiving side operation section is operated before copy is executed in accordance with the settings received from the transmitting side operation section after the power is turned on, and the operation corresponding process execution unit can execute copy in accordance with the same settings as the operation corresponding process before the power is turned off after copy is executed in accordance with the settings received from the transmitting side operation section. With this configuration, the operation corresponding process assigned to the receiving side operation section can be switched at more appropriate timing.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
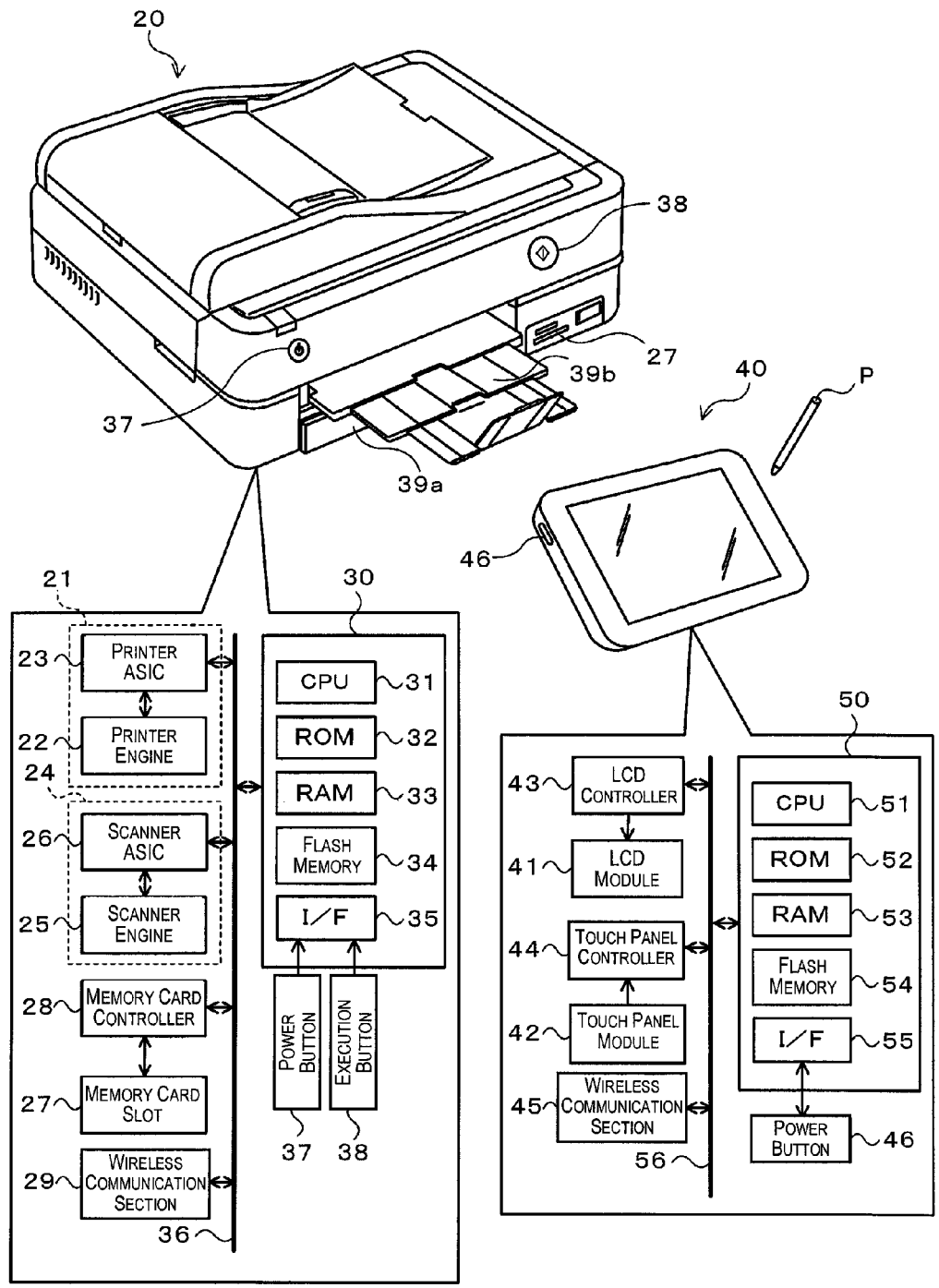
FIG. 1 is a schematic configuration diagram of a multi-function printer according to the present embodiment.

Next, embodiments of the invention will be explained with reference to the attached drawings. FIG. 1 is a configuration diagram that schematically shows the configuration of the multi-function printer as an embodiment of the invention. The multi-function printer according to the present embodiment has a multi-function printer main body 20 that can execute various kinds of functions such as a print function, a copy function, a scanner function, and the like, and a remote terminal 40 that transmits settings on various kinds of functions or execution instructions to the multi-function printer main body 20 by wireless communication such as a wireless LAN, Bluetooth (registered trademark), infrared communication, or the like.

As shown in the drawing, the multi-function printer main body 20 has a printer unit 21, a scanner unit 24, a memory card controller 28, a wireless communication section 29, a power button 37, an execution button 38, and a main controller 30. The printer unit 21 executes printing to paper. The scanner unit 24 executes scanning to a document placed on a platen which is not shown in the drawing. The memory card controller 28 conducts reading or writing of a file to a memory card which is inserted into a memory card slot 27. The wireless communication section 29 conducts wireless communication with respect to the remote terminal 40. The power button 37 turns on or off the power. The execution button 38 instructs to start executing various kinds of functions. The main controller 30 controls the entire device. In the multi-function printer main body 20, the printer unit 21, the scanner unit 24, the memory card controller 28, the wireless communication section 29, and the main controller 30 are electrically connected through a bus 36 so as to communicate with each other for various kinds of control signals or data.

The printer unit 21 has a printer engine 22, and a printer ASIC 23 that controls the printer engine 22. According to the present embodiment, the printer engine 22 is configured as an ink-jet type printer engine that executes printing by feeding paper from a paper feed tray 39a, ejecting ink of each color including cyan (C), magenta (M), yellow (Y), and black (K) from a printing head to the fed paper based on data for printing, and discharging paper to a paper discharge tray 39b.

The scanner unit 24 has a scanner engine 25, and a scanner ASIC 26 that controls the scanner engine 25. According to the present embodiment, the scanner engine 25 is configured as a flat-bed type scanner engine in which light is emitted toward a document placed on the platen and reflected light from the document is decomposed into each color of red (R), green (G), and blue (B) so as to obtain image data.

The main controller 30 of the multi-function printer main body 20 is configured as a microprocessor centered on a CPU 31, and includes a ROM 32, a RAM 33, a flash memory 34, and an interface 35 (I/F) in addition to the CPU 31. The ROM 32 stores various kinds of processing programs or various kinds of data. The RAM 33 temporarily stores data. The flash memory 34 is a non-volatile memory that retains data after the power is turned off. An operation signal from the power button 37 for turning on or off the power, an operation signal from the execution button 38 for instructing to execute copy, or the like is input to the main controller 30 through the I/F 35. Also, various kinds of detection signals or the like from the printer unit 21, the scanner unit 24, and the memory card controller 28 are input to the main controller 30. Instructions to read out a file from the memory card MC are output from the main controller 30 to the memory card controller 28. Instructions to print are output from the main controller 30 to the printer unit 21 (the printer ASIC 23). Instructions to scan (instructions to read a document) are output from the main controller 30 to the scanner unit 24 (the scanner ASIC 26).

The remote terminal 40 is configured as a touch panel type liquid crystal display in which an LCD module 41 for displaying a screen of various kinds of menus and a touch panel module 42 for inputting with a pen are combined. A side portion of the remote terminal 40 has a power button 46 for starting the terminal as shown in FIG. 1.

The touch panel module 42 is a coordinate input device that inputs a coordinate of a point contacted by a pen P or a human body (such as a finger) on a touch screen. In the present embodiment, a projection type capacitance method is employed in which multipoint detection for detecting contacts with two or more points is possible. Needless to say, the method regarding the touch panel module 42 is not limited to a capacitance method, and various methods such as a resistive film method, an electromagnetic induction method, or the like can be employed.

The remote terminal 40 has a main controller 50, an LCD controller 43, a touch panel controller 44, and a wireless communication section 45 as the control system thereof. The main controller 50 controls the entire device. The LCD controller 43 conducts control of display to the LCD module 41. The touch panel controller 44 conducts control of input to the touch panel module 42. The wireless communication section 45 conducts wireless communication with respect to the multi-function printer main body 20. These are electrically connected with each other through a bus 56.

The main controller 50 of the remote terminal 40 is configured as a microprocessor centered on a CPU 51, and includes a ROM 52, a RAM 53, a flash memory 54, and an interface 55 (I/F) in addition to the CPU 51. The ROM 52 stores various kinds of processing programs or various kinds of data. The RAM 53 temporarily stores data. The flash memory 54 is a non-volatile memory that retains data after the power is turned off. An operation signal or the like from the power button 46 is input to the main controller 50 through the I/F 55, and a coordinate signal or the like from the touch panel controller 44 is input to the main controller 50. Also, a control signal or the like is output from the main controller 50 to the LCD controller 43.

Figure 2:
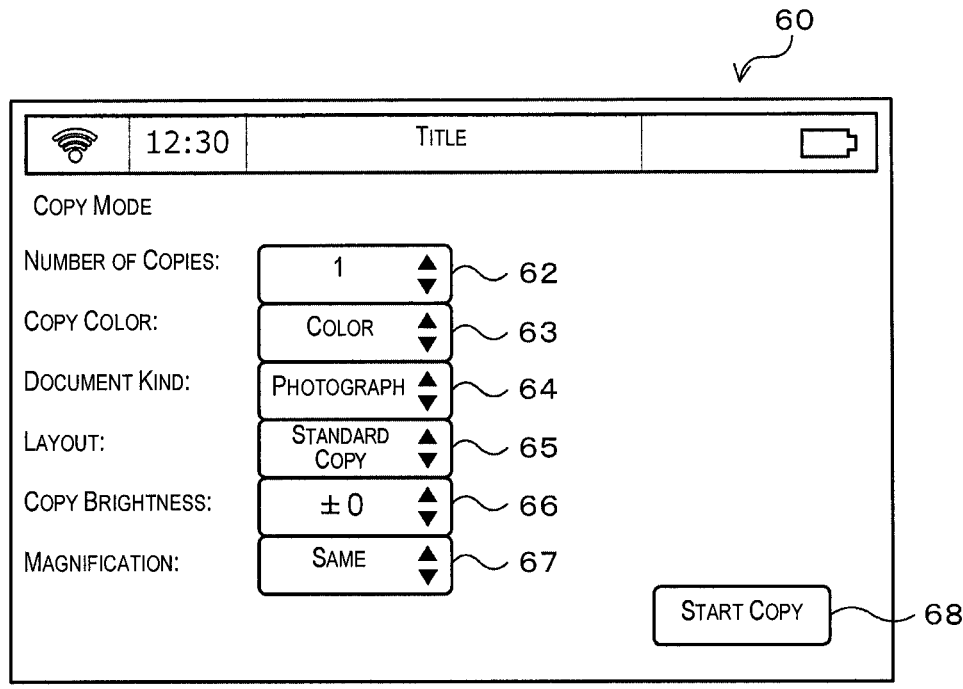
FIG. 2 is a diagram that explains an example of a copy mode screen.
Figure 3:
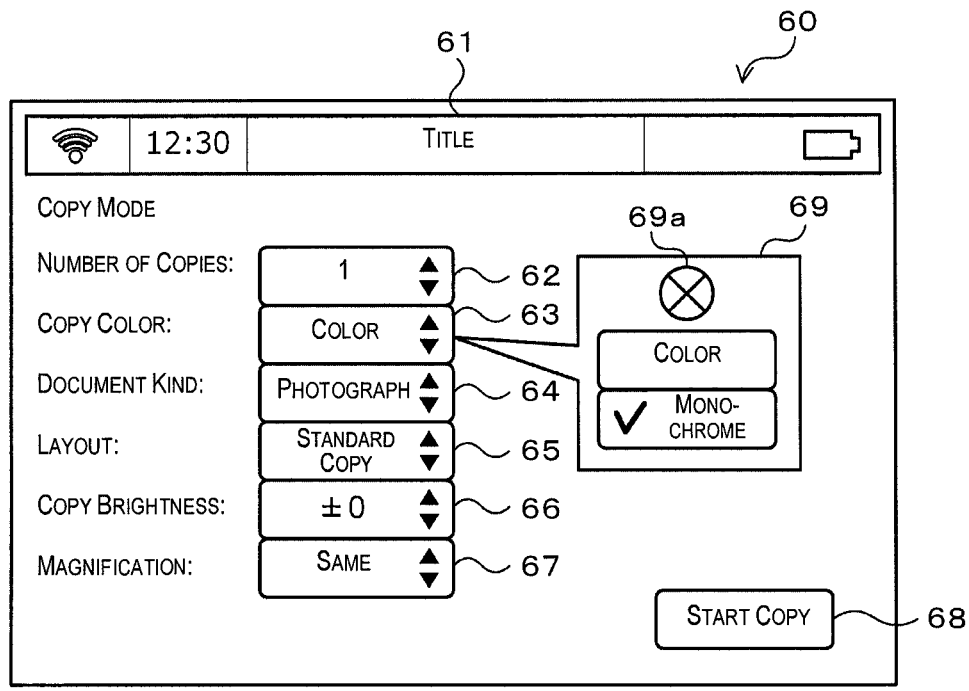
FIG. 3 is a diagram that explains a state of setting copy color.

Explanations will be made on an operation of the multi-function printer according to the present embodiment configured as above, in particular, an operation in the case where the multi-function printer main body 20 is used as a copying machine. In order to use the multi-function printer main body 20 as a copying machine, paper is set in the paper feed tray 39a of the multi-function printer main body 20, and a document to be copied is set on the platen. Then, a copy mode screen is called up with a menu screen of the remote terminal 40. The menu screen is not shown in the drawing. After various kinds of settings on the copy are designated on the copy mode screen, a start of the copy is instructed. FIG. 2 is a diagram that explains an example of a copy mode screen 60. As shown in FIG. 2, the copy mode screen 60 has a menu that includes a copy number designating frame 62, a copy color designating frame 63, a document kind designating frame 64, a layout designating frame 65, a copy brightness designating frame 66, a magnification button frame 67, a copy start button frame 68, and the like. The copy number designating frame 62 is for designating the number of copies. The copy color designating frame 63 is for designating color copy or monochrome copy. The document kind designating frame 64 is for designating the kind of a document such as a photograph or characters. The layout designating frame 65 is for designating presence of margins (standard copy) or lack of margins. The copy brightness designating frame 66 is for designating the copy brightness by one point in a range of −5 to +5. The magnification button frame 67 is for designating the copy magnification. The copy start button frame 68 is for instructing to start copy. According to the present embodiment, the default settings on each of the designating frames 62-67 are as follows: the number of copies is "one", the copy color is "color", the document kind is "photograph", the layout is "standard copy", the copy brightness is "±0", and the magnification is "same". On the copy screen mode 60, when any one of the designating frames 62-67 is tapped, the list of setting items that can be selected by the tapped designating frame are displayed in a pop-up mode. The copy settings regarding the corresponding designating frame can be changed by tapping any one of the selection candidates. For example, as shown in FIG. 3, in order to change the copy color from "color" as the default settings into "monochrome", a pop-up display frame 69 is called up by tapping the copy color designating frame 63, and an area inside a "monochrome" button frame is tapped. Incidentally, when a close button frame 69a displayed in an upper portion of the pop-up display frame 69 is tapped, the pop-up display frame 69 is closed, and it returns to the screen shown in FIG. 2.

In the multi-function printer according to the present embodiment, the execution button 38 is provided in the multi-function printer main body 20, and copy can be executed with the above-described default settings by operating the execution button 38 without operating the remote terminal 40. Also, copy can be executed with copy settings other than the default settings under predetermined conditions described below.

Figure 4:
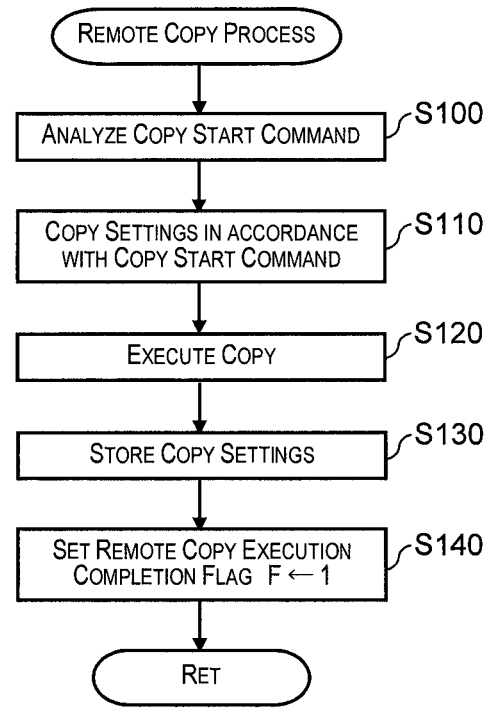
FIG. 4 is a flow chart that explains an example of a remote copy process.

Next, explanations will be made on details of an operation of the multi-function printer main body 20 in the case where execution of copy is instructed using the remote terminal 40, and details of an operation of the multi-function printer main body 20 in the case where execution of copy is instructed using the execution button 38. First, the former will be explained, and then, the latter will be explained. FIG. 4 is a flow chart that explains an example of a remote copy process. This routine is executed when receiving instructions to start copy (copy start command) from the remote terminal 40. The instructions to start copy are issued by calling up the copy mode screen 60 in the remote terminal 40 and tapping the copy start button frame 68 so as to transmit the copy start command to the multi-function printer main body 20. Here, the copy start command includes copy settings designated on the copy mode screen 60.

When the remote copy process is executed, the CPU 31 of the main controller 30 analyzes the copy start command received from the remote terminal 40 (step S100), sets the copy settings included in the copy start command as the copy settings to be used for this time (step S110), and copy is executed in accordance with the set copy settings (step S120). In executing copy, instructions to scan is transmitted to the scanner ASIC 26, image data obtained by an operation of scanning a document by the scanner engine 25 is converted into data for printing, and instructions to print is transmitted to the printer ASIC 23, so that printing is executed by the printer engine 22 based on the converted data for printing. Then, the copy settings set in step S110 is stored in the RAM 33 (step S130), a remote copy execution completion flag is set to a value "1" (step S140), and the remote copy process is finished.

Figure 5:
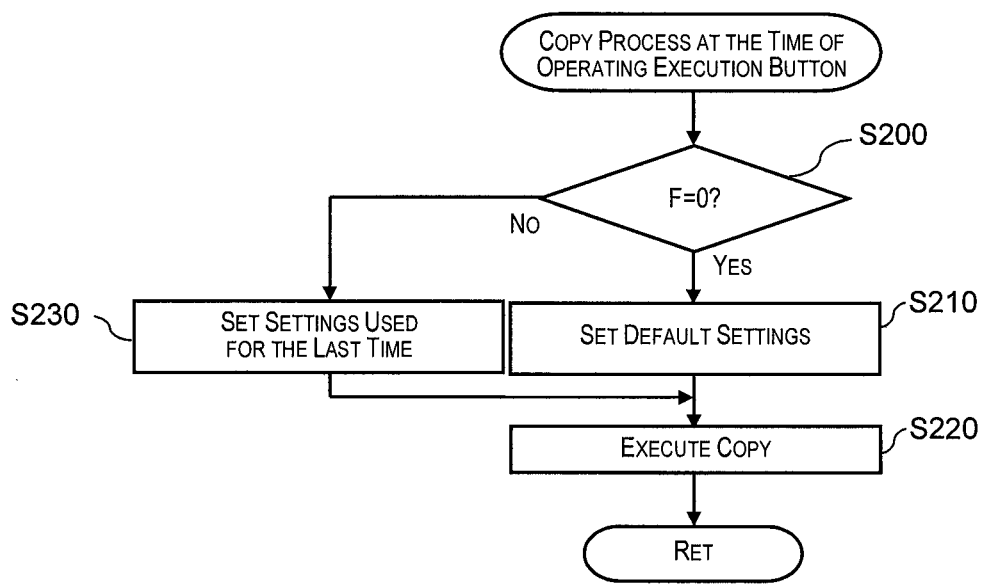
FIG. 5 is a flow chart that explains an example of a copy process at the time of operating an execution button.

FIG. 5 is a flow chart that explains an example of a copy process at the time of operating the execution button. This routine is executed when the execution button 38 of the multi-function printer main body 20 is operated.

Figure 6:
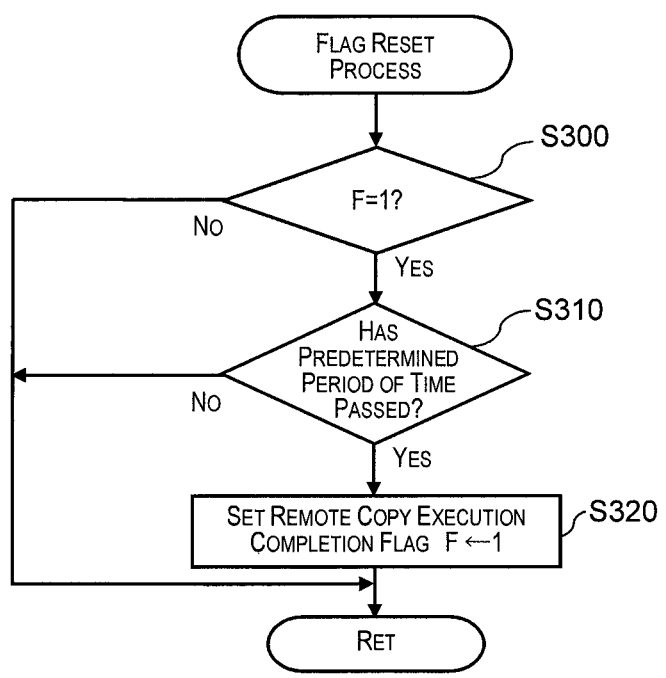
FIG. 6 is a flow chart that explains an example of a flag reset process.

When the copy process at the time of operating the execution button is executed, first, the CPU 31 of the main controller 30 determines whether or not the value of the remote copy execution completion flag F is "0" (step S200). Here, the remote copy execution completion flag F is set to a value "1" in step S140 when the remote copy process of FIG. 4 is executed, and the remote copy execution completion flag F is reset to a value "0" by the flag reset process shown in FIG. 6 when a predetermined period of time passes. As shown in FIG. 6, in order to reset the remote copy execution completion flag F in the flag reset process, it is determined whether or not the value of the remote copy execution completion flag F is "1" (step S300), and whether or not the predetermined period of time has passed after the remote copy execution completion flag F is set to a value "1" (step S310). When it is determined that the value of the remote copy execution completion flag F is "1" and the predetermined period of time has passed, the remote copy execution completion flag F is set to a value "0" (step S320).

When it is determined that the value of the remote copy execution completion flag F is "0", the default settings are set as the copy settings to be used for this time (step S210), and copy is executed using the set copy settings (step S220). On the other hand, when it is determined that the value of the remote copy execution completion flag F is "1", the copy settings, used for the last time and stored in the RAM 33, are set as the copy settings to be used for this time (step S230), and copy is executed using the set copy settings (step S220). More specifically, when the execution button 38 is operated in normal time, copy is executed with the default settings. However, once copy is executed by inputting copy settings on the remote terminal 40 side, copy can be executed again with the copy settings used for the last time only by operating the execution button 38 until a predetermined period of time passes. As described above, in the case where the multi-function printer main body 20 is used as a copying machine, it is necessary to do work to set a document to be copied on the platen on the multi-function printer main body 20 side, and do work to call up the copy mode screen to designate various kinds of copy settings or instruct to start copy on the copy mode screen on the remote terminal 40 side. Therefore, when both of work on the multi-function printer main body 20 side and work on the remote terminal 40 side are required in the case of executing copy with the default settings or repeating copy with the same settings, a user's work burden will be increased. According to the present embodiment, in order to prevent a user's work burden from being increased, the execution button 38 is provided on the multi-function printer main body 20 side, and execution of copy with the default settings and execution of copy with the settings used for the last time are switched as the process corresponding to the operation of the execution button 38.

Here, the correspondence relationship between the elements of the present embodiment and the elements of the invention will be made clear. The multi-function printer main body 20 of the present embodiment corresponds to the "main body" of the invention. The remote terminal 40 of the present embodiment corresponds to the "transmitting side operation section" of the invention. The execution button 38 of the present embodiment corresponds to the "receiving side operation section" of the invention. The main controller 30, that conducts the remote copy process of FIG. 4, the copy process at the time of operating the execution button of FIG. 5, and the flag reset process of in FIG. 6, corresponds to the "operation corresponding process execution unit" of the invention.

The multi-function printer of the present embodiment described above has the multi-function printer main body 20 that has a copy function, and the remote terminal 40 that can conduct various kinds of copy settings or instructions to start copy, and the execution button 38 is provided in the multi-function printer main body 20. When the execution button 38 is operated in normal time, copy is executed with the default settings. When copy is executed by inputting copy settings on the remote terminal 40 side, copy can be executed again with the copy settings used for the last time by operating the execution button 38 until a predetermined period of time passes. Therefore, in a case of executing copy with the default settings or repeatedly executing copy with the same settings as the settings used for the last time, a user's work burden can be reduced because it is sufficient for the user to operate the execution button 38.

In the multi-function printer of the present embodiment, instructions to start copy as well as settings on copy are conducted in the remote terminal 40. However, instructions to start copy can be conducted by operating the execution button 38 of the multi-function printer main body 20.

In the multi-function printer of the present embodiment, the remote copy execution completion flag F is reset (execution of copy with the copy settings used for the last time is switched to execution of copy with the default settings) at a timing when a predetermined period of time has passed after copy is executed with the copy settings input on the remote terminal 40 side. However, the invention is not limited to this, and a timing when the power is turned off by the power button 37 or a timing when the power is turned on by the power button 37 can be used. In these cases, copy is executed with the default settings when the execution button 38 is operated before copy is executed by inputting the copy settings on the remote terminal 40 side after the power is turned on. Also, copy is executed with the copy settings used for the last time when the execution button 38 is operated before the power is turned off after copy is executed by inputting the copy settings on the remote terminal 40 side. Further, a reset button can be provided in the multi-function printer main body 20, and the remote copy execution completion flag F can be reset at a timing when the reset button is operated. Also, the execution button 38 can serve as a favorite button to execute favorite settings. More specifically, contents desired by a user can be stored in a storing section of the multi-function printer as favorite settings in advance, and the contents corresponding to the favorite settings can be printed by pressing the execution button 38. Further, a plurality of kinds of favorite settings can be stored, and the plurality of kinds of favorite setting can be switched by pressing the execution button 38 a plurality of times (for example, twice) for a short period of time. Furthermore, in order for a user to know that the favorite setting have been switched, an LED can be provided in the vicinity of the execution button 38, and the LED can be lighted up with a different color for each of the favorite settings. Alternatively, in order for a user to know that the favorite setting have been switched, a speaker can be provided, and a user can be informed with sound. Here, the favorite settings can include various kinds of settings to control the multi-function printer and print data. Also, the remote terminal 40 can be used to add new favorite settings. With these configurations, desired contents can be printed more easily, and the user-friendliness can be improved.

In the multi-function printer of the present embodiment, copy is executed with the default settings as the process corresponding to the operation of the execution button 38 in normal time. However, the invention is not limited to this, and another process can be executed. For example, a process of instructing to start scanning each page can be executed in a case of continuously scanning a document including a plurality of pages.

According to the present embodiment, an example of applying the invention to the multi-function printer was explained. However, the invention can be applied to a copying machine having a copy function only.

According to the present embodiment, the remote terminal 40 and the multi-function printer main body 20 communicate with each other by wireless communication. However, wired communication can be possible.

It should be noted that the invention is not limited to the above-described embodiment at all, and various embodiments are possible as long as they belong to the technical scope of the invention.

What is claimed is:

1. A printing device comprising:
   a main body that executes printing;
   a transmitting side operation section in which settings on printing are input and the input settings are transmitted to the main body;
   a receiving side operation section including an execution button disposed in the main body; and
   an operation corresponding process execution unit disposed in the main body to execute an operation corresponding process corresponding to an operation of the receiving side operation section in a case where the receiving side operation section is operated,
   wherein the operation corresponding process execution unit executes printing in accordance with the settings received from the transmitting side operation section for a previous printing in a case where only the section execution button is operated within a period of time after the main body executed the previous printing in accordance with the settings received from the transmitting side operation section, and
   the operation corresponding process execution unit executes printing in accordance with default settings when the execution button is operated after the predetermined period of time passes.

2. The printing device according to claim 1, wherein the operation corresponding process execution unit executes a predetermined process different from inputting of the settings on printing as the operation corresponding process in a case where the execution button is operated before the main body executes printing in accordance with the settings received from the transmitting side operation section.

3. The printing device according to claim 2, wherein the operation corresponding process execution unit executes printing based on the default settings as the predetermined process.

4. The printing device according to claim 2, wherein the operation corresponding process execution unit executes the predetermined process as the operation corresponding process in a case where the execution button is operated before printing is executed in accordance with the settings received from the transmitting side operation section after the power is turned on, and executes printing in accordance with the settings received from the transmitting side operation section for the previous printing before the power is turned off after printing is executed in accordance with the settings received from the transmitting side operation section.

5. The printing device according to claim 1, wherein the input settings are transmitted from the transmitting side operation section to the main body by wireless communication.

6. The printing device according to claim 1, further comprising a document reading section, wherein a target of the printing is image data read by the document reading section.

7. A printing device comprising:
a processing section that executes a process;
a receiving section that can communicate with the processing section in a wired manner and receives settings regarding a process executed in the processing section;
a control section that controls the processing section in accordance with the settings; and
a button disposed in the processing section that allows a process in accordance with the settings,
the control section is configured to control the processing section to execute the process in accordance with the settings received in the receiving section for a previous process in a case where only the button is operated within a predetermined period of time after the processing section executed the previous process in accordance with the settings received in the receiving section, and
the processing section executes the process in accordance with default settings when the button is operated after the predetermined period of time passes.

8. The printing device according to claim 7, further comprising a document reading section,
wherein the process is printing of image data read by the document reading section.

* * * * *